Nov. 27, 1951      L. F. JONES      2,576,512
VOLUMETRIC FLUID MEASURING
Filed Oct. 5, 1948
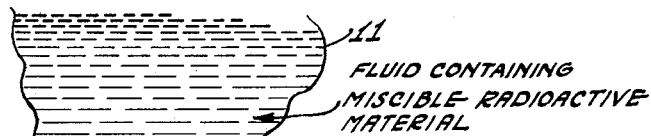
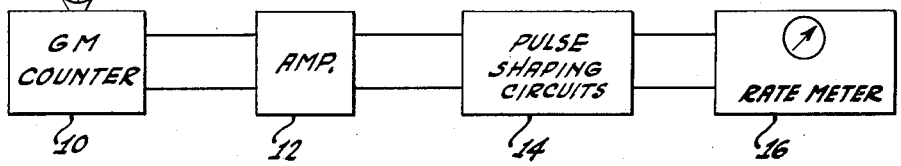
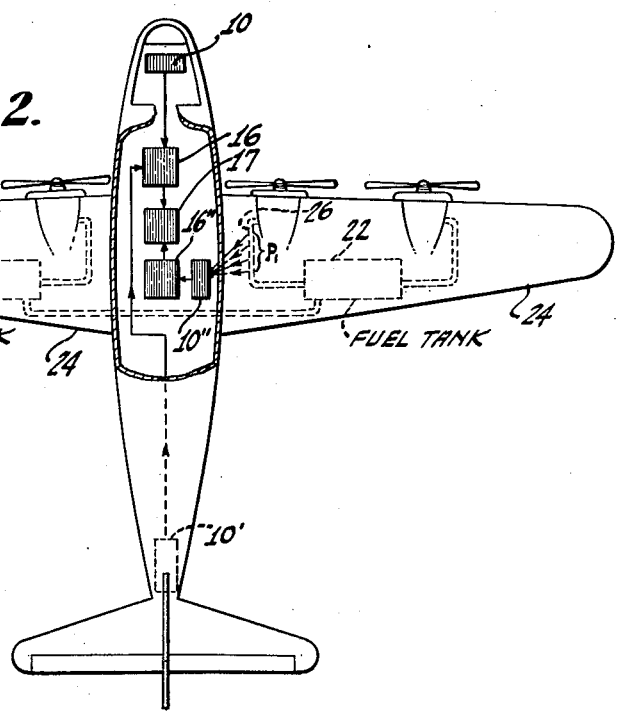
INVENTOR
LOREN F. JONES
BY
ATTORNEY Patented Nov. 27, 1951

2,576,512

UNITED STATES PATENT OFFICE 2,576,512

VOLUMETRIC FLUID MEASURING

Loren F. Jones, Germantown, Pa., assignor to Radio Corporation of America, a corporation of Delaware Application October 5, 1948, Serial No. 52,883

2 Claims. (Cl. 250—83.6)

This invention relates to improvements in the art of volumetric fluid measuring, and while not limited thereto, finds particular application in measuring the amount of fuel in aircraft fuel tanks.

One of the difficult problems encountered in the art of volumetric measuring is that of determining the amount of fluid in an unsymmetrical, closed container, especially where the container is being shifted in position, and where part of the contents is being continually withdrawn. One example of such a situation is in the case of aircraft fuel tanks, as such tanks are often peculiarly shaped in order to utilize available space in the aircraft, and the position of the aircraft in flight is subject to constant change. With conventional types of fuel gauges in odd-shaped tanks, an indication which is accurately calibrated for one position of the aircraft (and consequently of the tank) may be entirely erroneous when the aircraft changes position.

Another difficulty encountered in known fluid gauging methods and devices resides in the fact that the container itself is often in a relatively inaccessible spot and can only be reached through a long filler-pipe or the like. Consequently, if a mechanical gauge is used, such as a float-type gauge for example, repairs and/or replacements of damaged and worn-out parts may be difficult and costly.

A further difficulty is encountered when fuel-weighing gauges are used. In this case, turning movements and other sudden accelerations of the aircraft produce centrifugal forces which vary the apparent weight and, thus, the indicated volume of the fuel.

It is, accordingly, an object of the invention to provide an improved method of measuring the amount of fluid in a container.

Another object of the invention is to provide an improved method of measuring the amount of fluid in an unsymmetrical container.

A further object of the invention is to provide an improved method of gauging the amount of fluid in a relatively inaccessible container.

Another object of the invention is to provide an improved method of measuring and indicating the amount of fuel in a fuel tank.

According to the invention, the foregoing and other objects and advantages are attained by means of radioactive substances dissolved or dispersed in, or otherwise uniformly and intimately mixed or compounded with, the fluid. Radiation detectors, such as Geiger-Mueller counters, may be used to measure the amount of radiation per second from the fluid. By using suitable indicators, these measurements may be use to determine the mass and/or volume of fluid in the container.

A more complete understanding of the invention may be had by reference to the following description of illustrative embodiments thereof, when read in connection with the accompanying drawings in which Figure 1 is a diagrammatic representation of an electrical system for carrying out the method for measuring and indicating in accordance with the invention, and Figure 2 is a further diagrammatic representation of a system for aircraft fuel gauging likewise adapted for operation in accordance with the measuring and indicating method of the present invention.

As was previously mentioned, methods in accordance with the invention find particular application in the field of aircraft fuel gauging, and will, therefore, be described with reference thereto, although it will be readily apparent that the same or substantially similar methods are applicable to other analogous quantitive fluid measurements.

One method of applying the principles of the invention consists of the steps of introducing a small quantity of miscible radioactive substance into a fuel tank when the tank is being filled, or before, and measuring the amount of radioactive emanations from the dissolved material when the tank is full. The initial measurment may serve as a standard, with which subsequent measurements may be compared to determine the amount of fluid remaining in the tank. In this case, a calibrated indicator would not be required, since the magnitude of the initial reference measurement could be noted, and measurements obtained thereafter, which would amount to some fractional part of the reference measurement, would indicate that a corresponding fractional part of the total original volume of fluid still remained in the container.

As a modification of the foregoing method, a calibrated indicator could be used, in which case the same predetermined quantity of radioactive material would always be introduced per unit volume of fuel. With the indicator calibrated to read "full" with a predetermined amount of radioactive material in a filled tank, than as the fuel with its dissolved material is withdrawn from the tank, the number of radiations per second from the remaining fuel will decrease in proportion to the amount of fuel which has been used, and the measurements made by the counter will give an accurate indication of the amount of fuel remaining in the tank, regardless of the position of the aircraft.

In the two alternative methods of quantitative fluid measurement set forth above, it is assumed that the radioactive material used has a half-life (i. e. the time required for one half of a given unit quantity of material to decay or disintegrate) which is long compared to the length of time during which the measuring procedures are to be carried out. Where the half-life of the material is comparable to the length of the period of measurement, a modification of the foregoing methods may be adopted which will compensate for the effects of the rapid decay. This modification has the additional advantage that the indicator may be calibrated in units of fluid volume even though the quantity of radioactive material added to the fuel is not predetermined. In this case, an auxiliary measurement may be made of the radioactive emanations from a fluid sample of standard volume, as, for example, in a predetermined length of a fuel line between the fuel tanks and the carburation system. The ratio of the amount of radiation per second from the fuel in the tank, to the amount of radiation received from the predetermined length of fuel line, will decrease in proportion to the amount of fuel which has been used, and will not be affected either by the decay of the radioactive material or by variations in the amount of material originally added. This may be seen from the following considerations:

It can be assumed that, for a given concentration of radioactive material, the "tank" or main counter will initially measure (1) $C_m = xaK$ counts per second where $x$ is the number of cc.'s of fuel in the tank, $a$ is the number of counts per cc. of fuel per second, and $K$ is a proportionality constant depending on the distance of the counter from the tank and similar factors.

Similarly, the "line" counter will initially measure (2) $C_a = Na$ counts per second where $N$ is the number of cc.'s of fuel in the predetermined length of line under observation.

At some time $t$ seconds after the initial counts expressed by Equations (1) and (2) are obtained, the two counters will measure (3) $C_{m-t} = xae^{-\lambda t}K$ and (4) $C_{a-t} = Nae^{-\lambda t}$ where $\lambda$ is the transformation constant for the radioactive material (i. e., the fractional part of material which undergoes change each second).

Taking the ratio of Equation 3 to Equation 4, it will be seen that this ratio contains only one variable, $x$, which is not common to both the numerator and the denominator. Stated somewhat differently, the factor $\lambda$ (which expresses the half life of the radioactive material used) and the factor $a$ (which expresses the original concentration of the radioactive material) are eliminated in this method of measurement, and hence the only variable factor appearing in the final determination will be $x$, the quantity of fuel in the tank.

In the foregoing methods, any suitable radioactive material may be used which is miscible with the fluid being measured. In the case of gasoline, for example, one of the radioactive alkyl halides may be used, such as radioactive propyl iodide. Alternatively, other organic compounds containing radio-iodine, radio-chlorine, or radio-bromine may be used, and those isotopes which emit gamma radiation in excess of approximately one m.e.v. are considered preferable. The fluid compounds of iron, lead, and nickel, containing radio isotopes, could also be used.

Referring, next, to the drawing, the block diagram of Figure 1 illustrates a typical system suitable for measuring the radioactive emanations from a fluid in accordance with the invention. In the circuit of Figure 1, a radiation detector 10 is provided, such as a Geiger-Mueller counter or the like, which will respond to each emanation from radioactive material dispersed in the fluid in a container 11. The output of the counter 10 may be passed through an electrical amplifier 12 and suitable pulse shaping circuits 14 to a rate-meter 16, which is adapted to give a response proportional to the number of pulses received by the counter 10 per second. The meter 16 may be calibrated in terms of gallons of fuel, or may be uncalibrated where the first or third modification of the method of measurement, outlined above, is to be followed.

If the invention is to be applied to fuel gauging, either in piloted or pilotless types of aircraft, suitable arrangements are shown in Figure 2 for practicing the foregoing method and modifications thereof. In Figure 2, an airplane 20 is shown, having fuel tanks 22 mounted in the wings 24. A Geiger-Mueller counter 10, or other suitable radioactive emanation responsive device, may be mounted in the nose of the aircraft, and may be connected in a measuring system of the type shown in Figure 1. Such an arrangement would be adequate for fuel measurement in accordance with the first or the second modifications of the measuring method described above. However, as the airplane 20 either climbs or dives while in flight, the fuel in the tanks 22 will shift backward and forward, and the center of radiation for radioactive material dissolved in the fuel will also shift. In order to reduce possible errors due to this shifting action, two counters 10 and 10' may be used, one such counter being at the nose, and one at the tail of the airplane, respectively. The output of both of the counters 10 and 10' may be supplied to a single rate-meter, so that, as the radiations measured by one counter decrease, the radiations measured by the other counter will increase, and the combined indications of the two counters will largely compensate for errors due to shifts in the center of radiation of the fuel.

Where the third modification of the method of measurement described above is to be followed, an auxiliary counter 10'' may be used, said auxiliary counter being mounted adjacent to one of the fuel lines 26 of the aircraft, and being suitably shielded so that only radiations from a predetermined length P of the line 26 will be received and registered by the auxiliary counter. As was previously explained, the emanations registered by the auxiliary counter 10'' will remain substantially constant as long as the line 26 remains full of fuel, and hence, a comparison between the measurements made by the counter 10'' and the measurements made by the counter 10 (or by the counters 10 and 10') will give an accurate indication of the amount of fuel remaining in the tanks. The measurements of the counters 10 and 10' may be supplied to one rate meter 16, and compared with the measurements made by the counter 10" as indicated on an auxiliary rate meter 16"; or a comparator device 17 may be used in which a single indication is provided, said indication being proportional to the ratio between the measurements made by the counters 10 and 10', and the measurement made by the counter 10".

Other variations and modifications of the method of measurement set forth herein, all within the scope and spirit of the invention, will undoubtedly be apparent to those skilled in the art, and the foregoing is therefore to be construed as illustrative, and not in a limiting sense.

What is claimed is:

1. The method of determining the amount of fluid in a container, from which container said fluid is subjected to withdrawal, said method comprising the steps of introducing a miscible radioactive material into said fluid to obtain radioactive emanations therefrom, making simultaneous and cumulative measurements of the amount of radioactive emanations from said fluid at a plurality of spaced points about said container, measuring the amount of said radioactive emanations from a standard volume sample of said fluid containing said radioactive material, and comparing said measurement obtained from the fluid in said sample with the corresponding measurement obtained from the fluid in said container to obtain comparative indications of the amount of fluid in said container and in said sample, whereby the amount of fluid in said container may be determined.

2. The method of determining the amount of fuel in a fuel system comprising a fuel container and a fuel line for conducting fuel from said container to a point of use for said fuel, said method comprising the steps of introducing a miscible radioactive material into said fuel to obtain radioactive emanations therefrom, making simultaneous and cumulative measurements of the amount of radioactive emanations from said fuel at a plurality of spaced points about said fuel container, making a measurement of the amount of said radioactive emanations from the fuel containing said radioactive material in a predetermined length of said fuel line, comparing said measurement obtained from said fuel in said line with the measurement obtained from the fuel in said container, and utilizing said comparative measurements to determine the amount of fuel in said system.

LOREN F. JONES.

REFERENCES CITED

The following references are of record in the file of this patent:

UNITED STATES PATENTS

| Number | Name | Date |
|---|---|---|
| 2,264,725 | Shoupp et al. | Dec. 2, 1941 |
| 2,352,993 | Albertson | July 4, 1944 |
| 2,365,553 | Hill | Dec. 19, 1944 |
| 2,477,776 | Talbot | Aug. 2, 1949 |

OTHER REFERENCES

Livingood and Seaborg: Reviews of Modern Physics, vol. 12, Jan. 1940, pp. 30–43.